Patented June 16, 1931

1,810,011

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO NEWPORT CHEMICAL CORPORATION, A CORPORATION OF DELAWARE

2-NITRO-7-CHLORO-ANTHRAQUINONE AND PROCESS OF MAKING THE SAME

No Drawing. Application filed July 2, 1927. Serial No. 203,262.

This invention relates to 2-nitro-7-chloro-anthraquinone and to a process of making the same.

It is an object of this invention to provide a practicable method for making 2-nitro-7-chloro-anthraquinone and to render such product technically available for use as an intermediate for valuable dyestuffs.

Other and further important objects of this invention will become apparent from the disclosures in the following description and appended claims.

We have discovered that under certain conditions 2-nitro-7-sulpho-anthraquinone, described and claimed in our co-pending application Serial No. 203,261, filed July 2, 1927, can be transformed practically quantitatively into 2-nitro-7-chloro-anthraquinone. Our process consists in digesting the 2-nitro-7-sulpho-anthraquinone in dilute acid solution in the presence of nascent chlorine. It is not obvious that this reaction would take place in preference to others in the case of a beta-nitro-anthraquinone, since other side reactions are possible until it has been demonstrated that they do not take place. It is a well known fact, for instance, that many nitro-sulpho acids are unstable in an acid solution at an elevated temperature, particularly nitro-naphthalene-sulpho acid.

The present reaction is most probably best expressed by the following chemical equation:

cial acetic acid. It is easily soluble in boiling chloro-benzene, glacial acetic acid or alcohol, but less soluble in the cold. It is practically insoluble in cold water. After repeated crystallizations from chloro-benzene the purified product has a melting point of about 251–252° C.

Without limiting our invention to any particular procedure, the following example, in which parts by weight are given illustrates the application of our invention in the preferred form:

35.5 parts of 2-nitro-anthraquinone-7-sulpho-acid (sodium salt) are suspended in 1750 parts of water containing 90 parts of 20° Bé: hydrochloric acid. The mass is heated to the boiling point and while boiling there is introduced over a period of about 20 hours a solution consisting of 35.5 parts of sodium chlorate in 500 parts of water. The total volume of the reaction mass is kept about constant by the introduction of steam from a steam jet. The product that precipitates is filtered off, washed with hot water and dried. The yield of 2-nitro-7-chloro-anthraquinone is practically quantitative.

The corresponding bromo-compound may be produced by following the directions of the above example, using bromine instead of chlorine reagent. It is obvious that the free acid instead of the mono sodium salt may be used as a starting material.

We are aware that numerous details of the

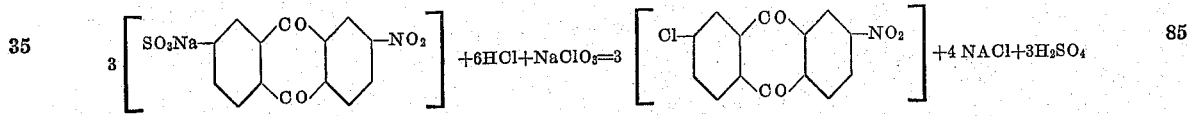

It is obvious to us that other agents which produce free chlorine will give similar results; as for example, instead of using sodium chlorate, sodium chlorite and dilute acid could be used, or chlorine introduced as such. We are also aware of the fact that instead of using chlorinating agents, brominating agents could be used, thus giving the analogous bromo substitution products.

2-nitro-7-chloro-anthraquinone is a light yellow crystalline body which may easily be recrystallized from chloro-benzene or glacial process may be varied through a wide range without departing from the principles of this invention, and we therefore, do not purpose limiting the patent granted hereon, otherwise than necessitated by the prior art.

We claim as our invention:

1. The process which comprises heating 2-nitro-7-sulpho-anthraquinone in dilute hydrochloric acid solution with a solution of sodium chlorate to form 2-nitro-7-chloro-anthraquinone.

2. As a new article of manufacture, 2-nitro-7-chloro-anthraquinone, having most probably the following chemical constitution:
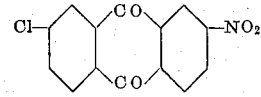
In testimony whereof we have hereunto subscribed our names at Carrollville, Milwaukee County, Wisconsin.
IVAN GUBELMANN.
HENRY J. WEILAND.
OTTO STALLMANN.